(12) United States Patent
Berglund et al.

(10) Patent No.: US 10,109,316 B2
(45) Date of Patent: Oct. 23, 2018

(54) METHOD AND APPARATUS FOR PLAYING BACK RECORDED VIDEO

(71) Applicant: Axis AB, Lund (SE)

(72) Inventors: Björn Berglund, Lund (SE); Xing Danielsson Fan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/602,687

(22) Filed: May 23, 2017

(65) Prior Publication Data
US 2017/0345458 A1 Nov. 30, 2017

(30) Foreign Application Priority Data
May 25, 2016 (EP) ..................................... 16171362

(51) Int. Cl.
*H04N 5/93* (2006.01)
*G11B 27/00* (2006.01)
*G11B 27/30* (2006.01)
*G11B 27/34* (2006.01)
*G11B 27/10* (2006.01)

(52) U.S. Cl.
CPC .......... *G11B 27/005* (2013.01); *G11B 27/002* (2013.01); *G11B 27/102* (2013.01); *G11B 27/3036* (2013.01); *G11B 27/3081* (2013.01); *G11B 27/34* (2013.01)

(58) Field of Classification Search
CPC ... G11B 27/005; G11B 27/002; G11B 27/102; G11B 27/3036; G11B 27/3081; G11B 27/34
USPC .......................... 386/329, 347, 350, 353, 356
See application file for complete search history.

(56) References Cited

U.S. PATENT DOCUMENTS

| 8,554,062 | B2 | 10/2013 | Green |
| 8,699,571 | B2 | 4/2014 | Bekiares et al. |
| 2005/0013365 | A1* | 1/2005 | Mukerjee ............... H04N 19/56 375/240.16 |
| 2005/0053300 | A1* | 3/2005 | Mukerjee ............. H04N 19/105 382/239 |

(Continued)

FOREIGN PATENT DOCUMENTS

| WO | 1997/30544 A2 | 8/1997 |
| WO | 2000/22820 A1 | 4/2000 |

OTHER PUBLICATIONS

EP 16 17 1362.3 European Search Report (dated Nov. 16, 2016).

*Primary Examiner* — Helen Shibru
(74) *Attorney, Agent, or Firm* — Volpe and Koenig, P.C.

(57) ABSTRACT

A method and an apparatus for playing back recorded video from a temporal position within a temporal range of the recorded video is disclosed. The recorded video including intra frames and inter frames and the recorded video including video sequences having different frame rates. The method comprises receiving a request for playing back the recorded video from a specific temporal position recorded in the recorded video, identifying an intra frame at an earlier temporal position in the recorded video than the specific temporal position received in the request, playing back the recorded video in a first mode from the identified intra frame, and playing back the recorded video in a second mode from the specific temporal position in the recorded video when the playing back of the recorded video in the first mode have arrived at the specific temporal position of in the recorded video.

20 Claims, 3 Drawing Sheets

(56) References Cited

U.S. PATENT DOCUMENTS

| | | | | |
|---|---|---|---|---|
| 2007/0088971 A1* | 4/2007 | Walker | ............... | H04L 1/0041 |
| | | | | 714/4.1 |
| 2010/0195976 A1 | 8/2010 | Abe et al. | | |
| 2015/0104116 A1* | 4/2015 | Salvador | ............. | G06T 3/4053 |
| | | | | 382/300 |
| 2015/0296033 A1* | 10/2015 | Jung | ................. | G06Q 50/01 |
| | | | | 709/217 |
| 2017/0094304 A1* | 3/2017 | Chou | ................ | H04N 19/52 |
| 2017/0094311 A1* | 3/2017 | Chou | ................ | H04N 19/53 |

* cited by examiner

METHOD AND APPARATUS FOR PLAYING BACK RECORDED VIDEO

FIELD OF INVENTION

The invention relates to a method and an apparatus for playing back recorded video from a randomly selected position in the recorded video. The recorded video being recorded using variable frame rate, also referred to as dynamic or variable fps (frames per second).

BACKGROUND

Digital video is the most common and a very popular form in which videos are recorded today. One drawback of digital video is that it require large amounts of storage space on hard drives and a lot of bandwidth in the networks. This is particularly the case for surveillance video in which a lot of video is recorded during vast time frames. In connection with the present disclosure, digital video refers to digital motion video which uses much more data than digital still images. In order to decrease the amount of data needed to represent a digital video, plenty of compression schemes have been developed, e.g. H.262, H.264, H.265, and MPEG. However, decreasing the amount of data used for representing digital video is subject to continuously ongoing research.

Video recordings and video streams, compressed or uncompressed, are represented by sequences of image frames which are recorded and played back a specified frequency. This frequency is often referred to as frame rate or fps (frames per second). One development in the area of digital motion video compression has been to introduce variable frame rate. Variable frame rate is to be understood as the frame rate for a digital video being varied during the duration of the recorded video. For example, during a time period with very little movement and/or action in the scene, e.g. small changes in captured images, the frame rate may be adjusted to a very low value, e.g. 1 fps, and then when the camera identifies movement and/or action in the scene, e.g. large or rapid changes in captured images, the frame rate may be adjusted to a value for capturing of the movement, e.g. 30 fps. Hence, variable frame rate potentially saves a lot of bandwidth and/or storage space. In particular in monitoring or surveillance type scenarios where a lot of recordings to not include any movement at all.

Common encoding schemes such as MPEG encoding of various types, H.264, H.265, etc. employs an encoding scheme in which some frames are spatially encoded, i.e. encoded based on information in the frame itself, and other frames are temporally encoded, i.e. encoded based on changes in image elements or objects in relation to a previous image frame or frames and/or a later image frame or frames. Spatially encoded image frames are referred to as intra frames and temporally encoded image frames are referred to as inter frames. Many of the encoding schemes refers to the intra frames as I-frames and refers to the inter frames as P- or B-frames. P-frames are related to a previous frame, i.e. in order to be decoded it rely on information of a previously decoded image frame. B-frames are related to both a previous frame and a future frame. An image stream or an image file may be described as a sequence of intra frames and inter frames. Hereinafter will both image stream streamed to a device and a video file stored and distributed from a storage device may be referred to as an image stream. The image stream has to start with an intra frame in order to have a complete image which the inter frames can depend on. The intra frame is then followed by one or a plurality of inter frames until another intra frame is present in the image stream. One intra frame and the following inter frames, which are preceding the next intra frame, is referred to as a GOP (Group of Pictures). Hence the structure may be depicted like in the two different structural examples shown below (I=Intra frames P&B=Inter frames):

IPPPPBPPPPIPPPPBPPPPIPPPPBPPPPIPPPPBP-
PPP . . .
IPPPPPPPPPPPPPPPPPPIPPPPPPPPPPPPPPPPPP . . .

Another development in this area has been to introduce a technique called variable GOP-length (Group of Pictures). The GOP-length is defined as one intra frame added to the number of inter frames until the next intra frame, in the examples above the GOP-length is 10 and 19, respectively. Usually one of the intra frames is included in the GOP-length. The basic idea behind variable GOP-length is based on the fact that an intra-frame requires a lot more data than an inter-frame and that the required storage space or bandwidth will be substantially reduced if the intra frames are less frequent, i.e. longer GOP-length. However, there is a drawback with longer GOP-lengths. The drawback is that the greater number of inter-frames the more artefacts are introduced in the video due to the inter-frames relying on information aggregated from previous inter-frames and, thus, artefacts in these previous inter-frames are also aggregated. One of the objects of the intra-frame is to reset these artefacts by providing a non-dependent image frame including the entire image frame. Similar to the use of variable frame rate the long GOP-length may be used during periods of low or no action in order to save storage space and/or bandwidth. Then, in order to avoid too much artefacts in the recorded video the GOP-length is shortened when action and/or movement is present in the scene.

When a user or an operator want to access a recorded video at a specific temporal location, i.e. a specific time in the recording, the playback function should start playing from the specific temporal location. However, often this temporal location is represented by an inter-frame and because an inter-frame relies on earlier frames in order to display correct image information the playback function has to find an earlier intra-frame and then decode all frames in between the intra-frame and the inter-frame at the specific temporal location. This operation of starting a playback function at the random location in a recorded video is sometimes referred to as a trick play. Other common trick play functionalities are fast forward and reverse playback. One way of implementing trick plays like these is described in the international patent application WO00/22820. In this application the random access of a specified temporal location is implemented so that the process after identifying the selected frame finds the I-frame, which in this case corresponds to the previously discussed intra-frame, using information stored in an auxiliary file including an offset of the I-frame. When the I-frame has been found the I-frame and subsequent P-frames, which in this case corresponds to the previously discussed inter-frames, will be decoded but not displayed until the selected frame is decoded. Another way of implementing the trick play such as random access to a time point in video recording is described in the international application WO 97/30544. In this application the target frame at the specified time point in the recorded video is identified using a video frame index being an array of offset numbers indicating at what byte each picture starts and whether the picture is an I-, P- or B-frame. Then the earlier frames that the requested frame is depending on is parsed.

These methods are complicated and requires a lot of changes to a basic playback function not already implementing a random access playback function.

SUMMARY

A method and apparatus to facilitate monitoring and viewing recorded video is disclosed. The method and apparatus also facilitates access and interpretation of recorded surveillance video.

An embodiment of a method for playing back recorded video is described in claim 1. Further embodiments are presented in the dependent claims.

More specifically, according to one embodiment, a method for playing back recorded video from a temporal position within a temporal range of the recorded video, the recorded video including intra frames and inter frames, and the recorded video including video sequences having different frame rates, the method comprises receiving a request for playing back the recorded video from a specific temporal position recorded in the recorded video, identifying an intra frame at an earlier temporal position in the recorded video than the specific temporal position received in the request, playing back the recorded video in a first mode from the identified intra frame, and playing back the recorded video in a second mode from the specific temporal position in the recorded video when the playing back of the recorded video in the first mode have arrived at the specific temporal position of in the recorded video. The playing back of the recorded video in the first mode includes playing back the recorded video at a constant and predetermined frame rate and in the second mode play back the recorded video at a variable frame rate that is continuously proportional to the frame rate used during recording of corresponding video frame. One advantage of the above embodiment is that the operator will get a quick overview of a monitored scene leading up to the specified time and still enable to avoid the need of waiting for a long time for the video following the requested time point. Moreover, the switching between the two playback modes, i.e. the constant frame rate mode and the variable frame rate mode, allows the method and apparatus described herein to be implemented in both new and existing playback devices.

The temporal position included in the request for playing back the recorded video from a specific temporal position may be entered as a timecode by a user. Alternatively, or additionally, the temporal position included in the request for playing back the recorded video from a specific temporal position may be entered by means of selecting in a graphically presented timeline a specific point in time and/or by means of selecting a jump back button representing a predetermined length for a jump back in time.

In one embodiment the act of identifying an intra frame includes identifying an intra frame at a predetermined number of intra frame positions from the specific temporal position. Alternatively the act of identifying an intra frame includes identifying the intra frame temporally positioned immediately before the frame at the specific temporal position.

Moreover, the constant and predetermined frame rate may be set in the device playing back the recorded video. In some embodiments the constant and predetermined frame rate is not determined from data in the recorded video.

In some embodiments the variable frame rate for the second mode playing back of recorded video is continuously retrieved from frame rate data included in the recorded video data.

According to some embodiments the playing back in the second mode achieves variable frame rate by reading timestamps relating to frames in the recorded video stream and basing the playing back on these timestamps.

Further, the playing back of recorded video may include rendering a video signal for displaying from the recorded video.

According to another aspect, an apparatus implementing the method discussed above is disclosed.

A further scope of applicability of the present disclosure will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description. Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where:

FIG. 4a is a schematic view of GOPs in a recorded video corresponding to the recorded video of FIG. 3a;

FIG. 5b is a schematic view of intra and inter frames in the video showed in FIG. 5a.

Further, in the figures like reference characters designate like or corresponding parts throughout the several figures.

DETAILED DESCRIPTION

A method for random access of temporal locations, i.e. time points, in a recorded video will now be described more fully hereinafter. The recorded video may be any type of recorded video. However, the method is particularly suitable for video recordings from monitoring operations or surveillance operations.

Figure 1:
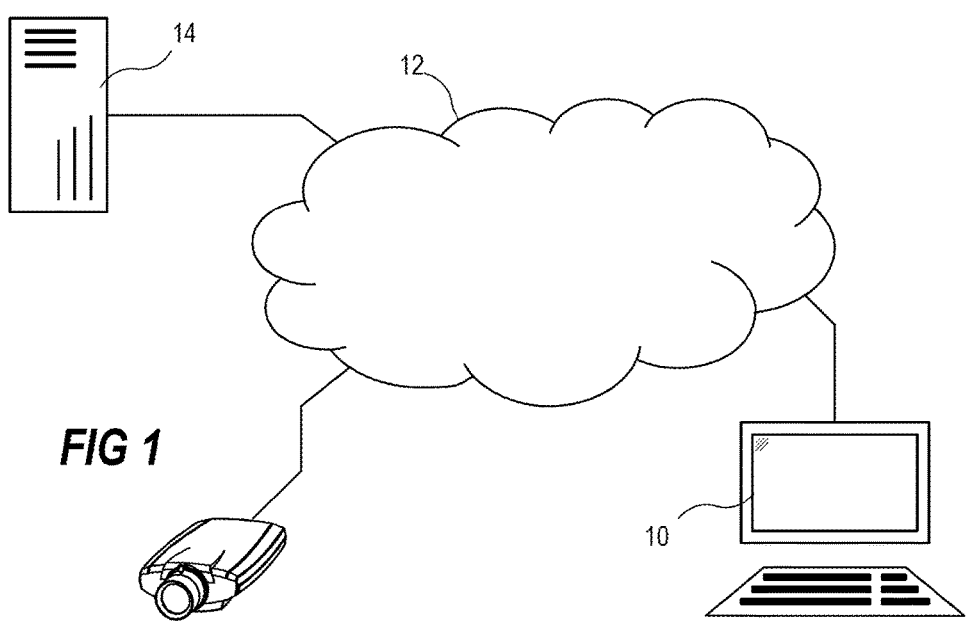
FIG. 1 is schematic block diagram of a system in which an embodiment may be included.

Now referring to FIG. 1 showing a possible system in which a playback device 10 is running a playback method. Playback device may be connected to a computer network 12 and be connected to a storage device 14. The playback device 10 may be a general purpose computer running the video playback software operating in accordance with the disclosure, may be a device that is an integral part in a monitoring/surveillance network for the purpose of enabling monitoring of video cameras 16 and replay of recorded material, may be a device running a video management software designed for surveillance, etc. The computer network 12 may be any type of network allowing transfer of video recordings between storage devices 14 and a playback device 10, e.g. a Local Area Network (LAN), a Wide Area Network (WAN), or the Internet. The storage device 14 of the system may be a video server, a media server, a file server, a networked attached storage (NAS), a network share, a monitoring camera or a surveillance camera storing recordings, etc. Alternatively, the video recordings for playback may be stored in the playback device itself.

Figure 2:
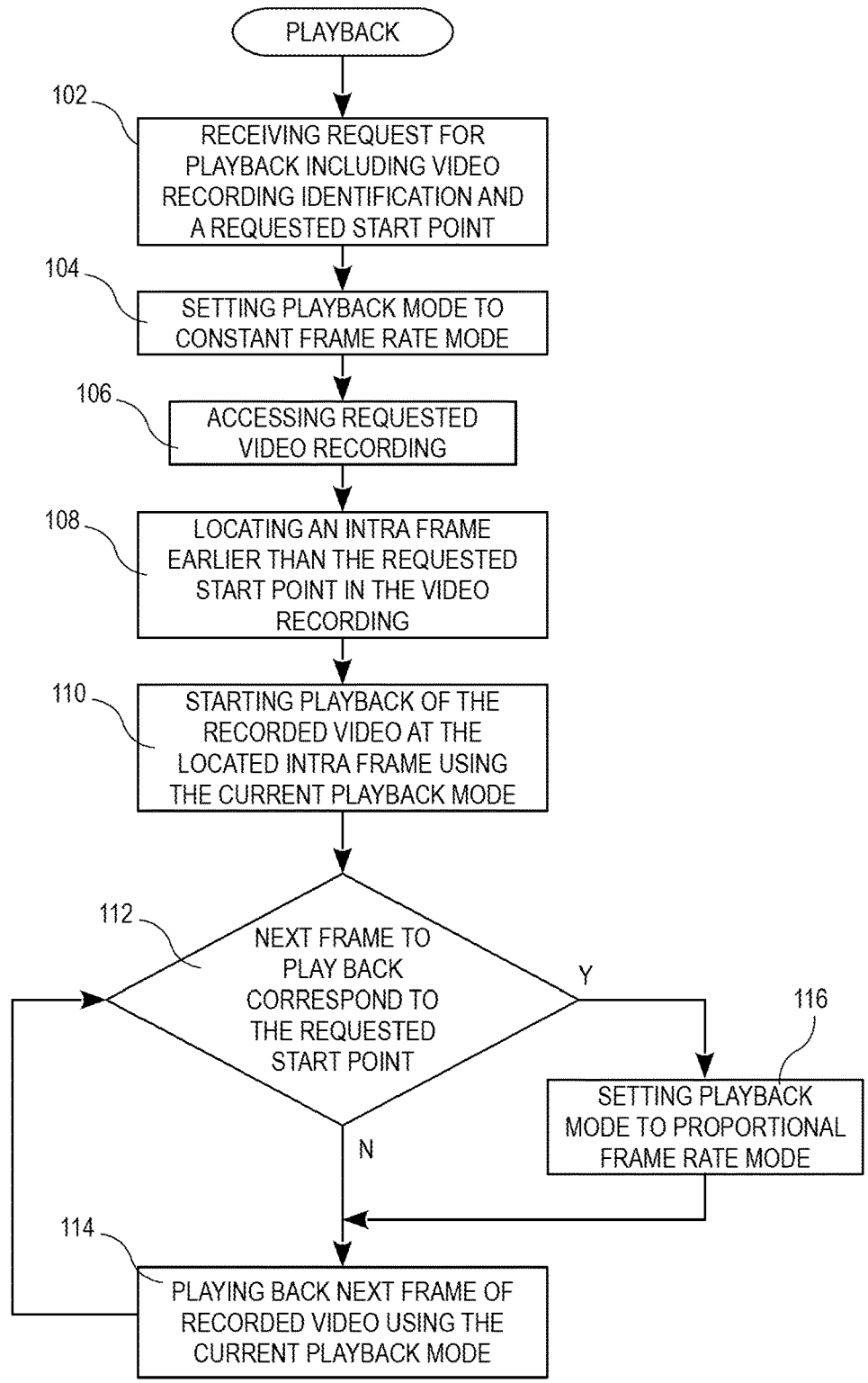
FIG. 2 is a schematic flowchart of a method according to one embodiment.

A playback method according to an embodiment includes, see FIG. 2, receiving an input from an operator or user requesting playback of a specific video recording from a specific point in time in the video recording, step 102. The operator or user may input a specific point in time by entering a timecode, by selecting a point on the timeline, by selecting the time from a list, by selecting predetermined jump back period indicated in the graphical interface, e.g. by means of a box displaying the jump back period. The recording identification may represent the presently viewed live view or another recording selected by the operator. Then the playback mode is set to constant frame rate mode, step 104, in which mode the play back device is arranged to play back the video at a constant and predetermined frame rate. The frame rate may be set before the playback from the specific time point in the recorded video was requested and may for instance be set to normal recording/playback frame rate such as 30 fps or 25 fps. However the pre-set frame rate may be any frame rate.

The requested video recording is accessed, step 106, at a storage device in the playback device, a server, a NAS, from a storage device incorporated in a camera, etc. Then the requested temporal position in the recorded video is found by means of reading time stamps stored in the video recording or stored in connection with the video recording. The time stamps may be stored in connection with each frame in the recorded video or they may be stored in information in a container format including the recorded video. An example of such a container format is Matroska. These timestamps are also the timestamps used in a second playback mode referred to as variable frame rate mode and which is used when the playback should be representing a normal playback speed, i.e. the events recorded is played back at a "real time" speed or a natural speed which corresponds to the speed at which the event was recorded. When the correct temporal position is found in the video recording an intra frame that is earlier in the video stream may be found by looking at a frame to which the frame at the temporal position is related for decoding and by checking if that frame is an intra frame or not. If it is an intra frame then the intra frame has been found otherwise the process have to proceed and look at a frame related to this latest checked inter frame for decoding. This type of back tracking, i.e. checking a temporally earlier frame, is then performed until the intra frame is found. Multiple intra frame back tracking may be achieved in the same way with the addition of counting the number of intra frames identified. Hence an intra frame to start decoding and playback from is found by parsing back in time until the desired number of intra frames have been identified, step 108, and wherein in some embodiments the first intra frame identified is the intra frame to start decoding and playback from. In some applications it is most interesting to start from the first intra frame preceding the requested temporal position in the video recording, i.e. the intra frame belonging the same GOP as the frame at the requested temporal position. However, in other applications it may be interesting to start the playback from even earlier intra frames by simply counting a predetermined number of intra frames when parsing for earlier intra frames and then start to play back at the desired intra frame when this desired intra frame is located. When the intra frame is found the playback of the recorded video is started from this intra frame using the current playback mode, which is the constant frame rate mode, step 110. From the start of the playback the frames to be displayed are checked in order to determine if the frame is a frame corresponding to the requested temporal position for the playback, step 112. If the requested temporal position has not been reached the playback continues playing back the next frame at the current playback mode, which still will be the constant frame rate mode, step 114. Then, the process returns to step 112 in order to check if the requested temporal position has been reached yet. When, the requested temporal position has been reached the process proceed to step 116 and switches the playback mode to variable frame rate mode and then the playing back of the next frame in step 114 will be in the variable frame rate mode. The playback will continue to playback the recorded video in the variable frame rate mode until the playback is stopped or another trick play is requested.

Figure 3A:
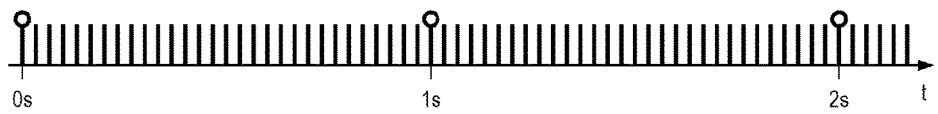
FIG. 3a is a schematic view of intra and inter frames in a recorded video.
Figure 3B:
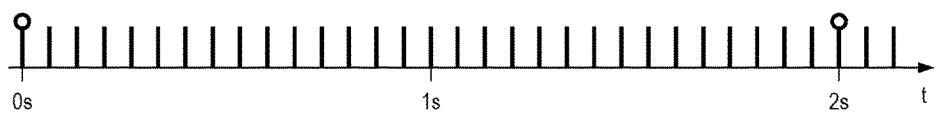
FIG. 3b is a schematic view of intra and inter frames in another recorded video.

As mentioned above, the recorded video played back using the disclosed embodiments is recorded implementing variable frame rate. In FIGS. 3a and 3b two video recordings both having constant frame rates but different frame rates are shown over a time period of little more than two seconds. Each intra frame is depicted as a short line with a circle on top and each inter frame is depicted as a short line. In FIG. 3a the GOP-length is 30 frames and the frame rate is 30 fps, as one GOP-length of 30 frames represents one second of video. In FIG. 3b the GOP-length is still 30 frames, but the time period represented by these 30 frames is two seconds instead of one. Hence, the frame rate of FIG. 3b is 15 fps. If the recorded video of FIGS. 3a and 3b are played back at the same frame rate, let us say 30 fps, then the video recording of FIG. 3a would be played back at real time speed, i.e. the speed it was recorded at. However, the recorded video of FIG. 3b would be played back at two times the speed, i.e. fast forwarded by two times, as the 30 frames representing 2 seconds of recorded material is played back in one second.

Figure 4A:
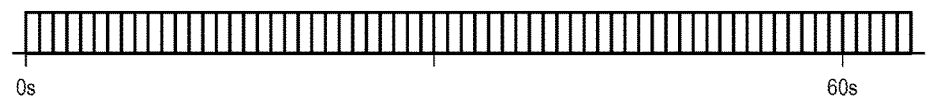
Figure 4B:
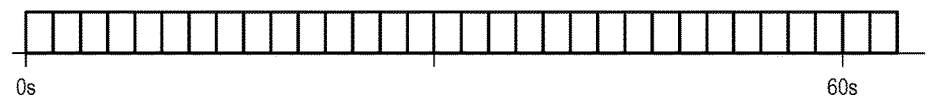
FIG. 4b is a schematic view of GOPs in a recorded video corresponding to the recorded video of FIG. 3b.

In FIGS. 4a-4b a longer sequence of each of the two video recordings of FIGS. 3a-3b is shown. Each square represents a GOP of 30 frames and as both recordings have the same GOP-length but different frame rate. Accordingly, one obvious difference between the two video recordings of FIGS. 4a-4b is that in the video recording of FIG. 4a 60 seconds is represented by 60 GOPs, i.e. 60×30=1800 frames, and in the video recording of FIG. 4b 60 seconds is represented by 30 GOP, 30×30=900 frames.

Figure 5A:
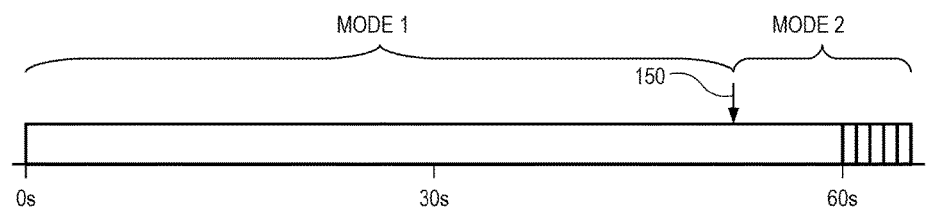
FIG. 5a is a schematic view of GOPs in a portion of a video recorded using variable frame rate.
Figure 5B:
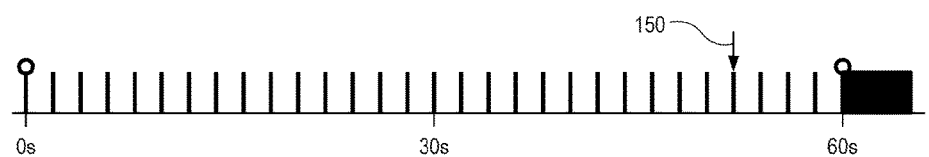

Now referring to FIGS. 5a-5b in which a change of frame rates in a variable framerate video recording is shown. In this example the GOP lengths are still kept constant and is set to 30 frames as in the previous examples of constant frame rate recordings in FIGS. 3a, 3b, 4a and 4b. The first 60 seconds is represented by a single GOP and accordingly the frame rate during these 60 seconds is 0.5 fps. Then, at 60 seconds the frame rate becomes higher, in this case 30 fps. The reason for the higher frame rate may be that movement has been detected during recording and the system is arranged to capture such events at a higher frame rate. Other, reasons for the higher frame rate may be that an input to the camera from, for example, an alarm system, an external motion detector, a door opening sensor, a window opening sensor, a light sensor, etc. is received and trigger the higher frame rate. There may be plenty of events and/or reasons for a higher frame rate. However, the recording of the video is not part of the present disclosure and will therefore not be described in more detail.

In one possible scenario an operator or user selects, in any way described earlier, a random temporal position in the recorded video, indicated by arrow 150. The frame at the temporal position is an inter frame which is depending on earlier frames in order to be decoded properly. In a prior art system the playback device then will search and find an intra frame that is earlier than the inter frame at the selected temporal position and start playback from the intra frame. The system will then play back non requested video frames, but this would not be a problem in most systems because the playback will show these extra frames quite quickly due to the fps being relatively high and the GOP-length being moderate. Hence, these extra frames that are played back will hardly be noticed by the operator because the high fps will make them be showed in a second or at least during a short time period. However, when variable frame rate is implemented as in FIGS. 5*a*-5*b* the recorded video is played back in at real time frame rates, i.e. the frame rate used when recording each specific frame, therefore the waiting time for arriving at the requested temporal position when the playback device is playing back all frames from the earlier intra frame may be long. In the example of FIGS. 5*a*-5*b* the waiting time will be almost one minute and the setup could even result in worse waiting time if the GOP-length is longer and/or the fps is even lower.

In one embodiment, this scenario will be processed differently than in the prior art. The system will still search for the earlier intra frame and start playback from that intra frame. However, the play back is performed in a constant frame rate mode MODE 1. Hence, the system simply overrides the variable frame rate setting and play back at a constant frame rate. Then, when the frame at the requested temporal position is to be played back, the system switches playback mode from constant frame rate mode MODE 1 to variable frame rate mode MODE 2 and thereby switches into playing back the video recording from the requested temporal position in e.g. real time. Let us assume that the constant frame rate is set to 30 fps, then in the example of FIGS. 5*a*-5*b* the playback during MODE 1 will take less than a second, i.e. playing back 26 frames at 30 fps. At the requested temporal position 150 the playback mode is switched to the variable frame rate mode MODE 2 resulting in that the frames from the requested temporal position 150 to the 60 seconds position in the figure will take four seconds to play back.

The change of frame rate in a video recording is not bound to change at the start of a new GOP, but may change in the middle of a GOP. Hence, in case of an interesting temporal position is interesting due to movement in the captured scene, then the frame rate will be increased when the movement is detected as the recording system increases the recording frame rate when the captured scene includes movement. If this increased frame rate is at the end of a GOP then the prior art play back scheme will have to play back from the intra frame at a slow frame rate until the interesting high frame rate section of the GOP is reached and thereby wasting a lot of time for the operator. The implementation according to the disclosed embodiments will quickly show the low frame rate frames, as it will play them back at constant frame rate instead of in real time, thereby presenting a quick view of the scene before the requested temporal position and then switch to real time at the requested temporal position.

Playback in constant frame rate mode may be implemented as any standard playback method in which the frame rate is set to a predetermined value. This is a common way of implementing playback functions in playback devices and it includes initially reading a value indicating the frame rate, i.e. the fps of the recorded video, and then decoding and rendering an image to display from the encoded recorded video at the frequency initially set by the predetermined frame rate. Playback at variable frame rate mode are, as previously mentioned, a playback method playing back recorded variable frame rate video at a speed proportional to the real time speed at the capturing of the video. Accordingly, this mode will play back the recorded video at a rate that makes the video play back show moving objects moving at the same speed as they did at the capturing of the video or if slow motion or fast forward is selected at a speed that is X times the speed at the capture. Wherein X=2 is interpreted as a double playback speed in relation to the natural speed. In order to enable this each frame in the motion video recording is provided with or related to a time stamp reflecting the time of capture. The playback device is then reading the time stamp and makes it display at the correct time in relation to the previous image frame.

In some examples above a frame rate lower than 1 fps is used. For some decoders frame rates lower than 1 fps is difficult to manage at a good quality and in those cases the lowest frame rate should be 1 fps. However, if no such limitation is present in the decoders, then frame rates below 1 fps may be used.

What is claimed is:

1. Method for playing back recorded video from a temporal position within a temporal range of the recorded video, the recorded video including intra frames and inter frames, and the recorded video including video sequences having different frame rates, the method comprising:

receiving a request for playing back the recorded video from a specific temporal position recorded in the recorded video, the specific temporal position being at an inter frame;

identifying an intra frame at an earlier temporal position in the recorded video than the specific temporal position received in the request;

playing back the recorded video in a first mode from the identified intra frame to the specific temporal position; and playing back the recorded video in a second mode from the specific temporal position in the recorded video when the playing back of the recorded video in the first mode have arrived at the specific temporal position of in the recorded video, wherein playing back recorded video includes rendering a video signal for displaying from the recorded video, wherein the playing back of the recorded video in the first mode includes playing back the recorded video at a constant and predetermined frame rate and in the second mode play back the recorded video at a variable frame rate that is continuously proportional to the frame rate used during recording of corresponding video frame, and wherein the constant and predetermined frame rate is set in the device playing back the recorded video.

2. Method according to claim 1, wherein the temporal position included in the request for playing back the recorded video from a specific temporal position is entered as a timecode by a user.

3. Method according to claim 1, wherein the temporal position included in the request for playing back the recorded video from a specific temporal position is entered by selecting in a graphically presented timeline a specific point in time.

4. Method according to claim 1, wherein the temporal position included in the request for playing back the recorded video from a specific temporal position is entered by selecting a jump back button representing a predetermined length for a jump back in time.

5. Method according to claim 1, wherein identifying an intra frame includes identifying an intra frame at a predetermined number of intra frame positions from the specific temporal position.

6. Method according to claim 1, wherein identifying an intra frame includes identifying the intra frame temporally positioned immediately before the frame at the specific temporal position.

7. Method according to claim 1, wherein the constant and predetermined frame rate is set in a device playing back the recorded video.

8. Method according to claim 1, wherein the constant and predetermined frame rate is not determined from data in the recorded video.

9. Method according to claim 1, wherein the variable frame rate for the second mode playing back of recorded video is continuously retrieved from frame rate data included in data in the recorded video.

10. Method according to claim 1, wherein the playing back in the second mode achieves variable frame rate by reading timestamps relating to frames in the recorded video and basing the playing back of the recorded video on these timestamps.

11. Apparatus configured to play back recorded video from a temporal position within a temporal range of the recorded video, the recorded video including intra frames and inter frames, and the recorded video including video sequences having different frame rates, the apparatus comprises:
- a receiving device configured to receive a request for playing back the recorded video from a specific temporal position recorded in the recorded video, the specific temporal position being at an inter frame;
- an identifying device configured to identify an intra frame at an earlier temporal position in the recorded video than the specific temporal position received in the request; and
- a playback device configured to play back the recorded video in a first mode from the identified intra frame to the specific temporal position and to play back the recorded video in a second mode from the specific temporal position in the recorded video when the playing back of the recorded video in the first mode have arrived at the specific temporal position of in the recorded video, wherein the playback device is configured to play back recorded video by performing operations including rendering a video signal for displaying from the recorded video, and wherein the playback device is configured to play back of the recorded video in the first mode by performing operations including playing back the recorded video at a constant and predetermined frame rate and the playback device is configured to play back the recorded video in the second mode at a variable frame rate that is continuously proportional to the frame rate used during recording of corresponding video frames, wherein the constant and predetermined frame rate is set in the device playing back the recorded video.

12. Apparatus according to claim 11, wherein the temporal position included in the request for playing back the recorded video from a specific temporal position include a timecode.

13. Apparatus according to claim 11, wherein the temporal position included in the request for playing back the recorded video from a specific temporal position is entered by means of selecting in a graphically presented timeline a specific point in time.

14. Apparatus according to claim 11, wherein the temporal position included in the request for playing back the recorded video from a specific temporal position is entered by means of selecting a jump back button representing a predetermined length for a jump back in time.

15. Apparatus according to claim 11, wherein identifying an intra frame includes identifying an intra frame at a predetermined number of intra frame positions from the specific temporal position.

16. Apparatus according to claim 11, wherein identifying an intra frame includes identifying the intra frame temporally positioned immediately before the frame at the specific temporal position.

17. Apparatus according to claim 11, wherein the constant and predetermined frame rate is set in the device playing back the recorded video.

18. Apparatus according to claim 11, wherein the constant and predetermined frame rate is not determined from data in the recorded video.

19. Apparatus according to claim 11, wherein the variable frame rate for the second mode playing back of recorded video is continuously retrieved from frame rate data included in data in the recorded video.

20. Apparatus according to claim 11, wherein the playing back in the second mode achieves variable frame rate by reading timestamps relating to frames in the recorded video and basing the playing back of the recorded video on these timestamps.

* * * * *